3,367,977
PROCESS FOR THE PREPARATION OF PHENOL-α-MONOCHLOROHYDRIN MONOETHERS
Ewald Katzschmann, Dortmund-Kruckel, Germany, assignor to Chemische Werke Witten G.m.b.H., Witten (Ruhr), Germany
No Drawing. Filed Oct. 19, 1964, Ser. No. 404,949
Claims priority, application Germany, Oct. 25, 1963, C 31,238
9 Claims. (Cl. 260—613)

This invention relates to phenol glycol monoethers. More particularly, it relates to phenol-α-monochlorohydrin monoethers. Even more particularly, the invention relates to an improved process for the preparation of phenol-α-monochlorohydrin monoethers.

It is already known to react phenols with alkylene oxides, such as ethylene oxide, propylene oxide and others, in the aqueous phase in the presence of neutral inorganic alkali and/or alkaline earth salts to give the corresponding phenol glycol monoethers.

One of the objects of the present invention is to provide an improved process for the preparation of phenol glycol monoethers, specifically phenol-α-monochlorohydrin monoethers, which overcomes the disadvantages and deficiencies of the prior art processes.

Another object of the present invention is to provide a process for the preparation of phenol-α-monochlorohydrin monoethers which may be carried out in an efficacious and convenient manner.

A further object of the invention is to provide a process that yields phenol-α-monochlorohydrin monoethers in high purity and good yield.

A still further object of the invention is to provide a process for the preparation of phenol-α-monochlorohydrin monoethers which may be carried out easily and simply.

These and other objects of the present invention will become apparent to those skilled in the art from a reading of the following specification and claims.

In accordance with the present invention, it has been found that phenol-α-monochlorohydrin monoethers may be produced more efficaciously than with the prior art methods by reacting phenols, in the manner described, with epichlorohydrin instead of with alkylene oxides.

These ethers are of particular interest as glycerol derivatives because the production of glycerol monoethers is ordinarily a very expensive process.

The mono- and polynuclear and mono- and polyhydric phenols to be used in accordance with the novel method of the present invention are, for example, phenols, polyphenols, naphthols, bisphenols, and the derivatives thereof which are nuclearly substituted.

Used as water-soluble neutral inorganic alkali and/or alkaline earth salts are preferably the potassium, sodium, and calcium compounds of halogen hydracids, sulfuric acid, and nitric acid. Sodium and/or potassium chloride and/or calcium chloride have been found to be of particular advantage in the method described herein.

Small amounts of the water-soluble neutral inorganic alkali and/or alkaline earth salts are sufficient for initiating the reaction according to the method of the present invention. Particularly, it is advisable to employ amounts of from 0.5 to 20% by weight of the said inorganic salts, based on the weight of phenolic component used. However, amounts of between 2 and 10% by weight are preferred.

Comparative experiments have shown that monochlorohydrin monoethers are not produced if the water-soluble neutral inorganic alkali and/or alkaline earth salts to be employed in accordance with the present invention are not added to the reaction mixture. Moreover, the reaction time is strongly dependent upon the temperature. A reasonably satisfactory speed of reaction is achieved only above 60° C. The reaction should preferably be carried out at between approximately 70° and 100° C. under normal pressure and at temperatures of up to about 160° C. when using excess pressure. Higher temperatures may be utilized advantageously in some instances in dependence upon the phenol component used. However, then the technical expenditures bear no relation to the yields obtained.

Suitable reaction vessels for use herein are, for example, simple cylindrical storage vessels, round or flat boilers, and low pressure autoclaves, which are appropriately provided with a filling tube, reflux cooler, and a stirring or shaking device. The reaction vessels may be enameled, or they may be made of ceramic material, high-grade steel, glass or similar materials. Reactions which give a uniform solution or mixture may be carried out by using vessels without moving devices.

The course of the reaction may be followed easily by the determination of one or several characterizing numbers. In instances where the reaction product forms in two layers, it is advisable to determine the characterizing numbers of the oily phase, or to bring about such a thorough intermixture thereof that the uniformity of the sample is maintained. In actual practice, it is easy to determine the most favorable conditions of temperature and time.

The amount of the water constituent to be used in the reaction according to the present invention may vary within wide limits. It is preferable not to work with a quantitative ratio thereof of 1:1. The state of aggregation of the phenolic component is a determining factor. Thus, for example, the water proportion with the use of a solid or high-melting phenolic component, such as bisphenol or pentachlorophenol, should be greater than in the case of a phenol which is liquid under the operating conditions utilized.

Further treatment of the reaction products is carried out according to conventional procedures and causes no difficulties. When crystallizing ethers are used, they are centrifuged, filtered or decanted. When liquid ethers are used, they may be separated mechanically in settling vessels into an aqueous and into an oily phase. In special cases, the extraction may be carried out with a solvent, if desired, in conjunction with the phase separation. The aqueous phases may be reused in subsequent reactions.

The process according to the present invention may also be carried out continuously rather than batch-wise. This can be done particularly favorably, for example, by passing the intensively mixed starting product through a heated tubular system which terminates into a settling vessel. The ether may be continuously removed at the bottom of the vessel and the upper aqueous phase may be continuously returned into the preparing vessel.

The monoethers prepared according to the present invention are difficult to obtain by the prior art processes. As derivatives of glycerol, they form valuable components for further reactions, for example, esterification and polycondensation.

The following examples are given merely for purposes of illustration and are not to be considered as limiting.

*Example I*

A mixture of:

| | G. |
|---|---|
| Pentachlorophenol, solidification point 191° C. | 133 |
| Water, distilled | 350 |
| Calcium chloride | 12 |
| Epichlorohydrin, commercial | 70 | was combined at room temperature in a cylindrical glass vessel and heated to 85° C. with stirring over a 2-hour period. During this time, the solid/aqueous suspension became a brown oily/aqueous suspension. After a total of 4 hours, the heat was turned off and stirring continued until room temperature was attained. The solid proportions were filtered off, washed with water, and then reduced into small pieces by an intensive stirrer and dried. The product obtained weighed 173 grams, which represented 96.5 of the theoretical yield. The product was solid and had the following characterizing numbers—

Found: Saponification number, 302; chlorine content, 58.4%; melting point, 79°–83° C. Calculated: Saponification number, 312; chlorine content, 59.4%

After recrystallization from ligroin, the following characterizing numbers were found:

Found: Saponification number, 304; hydroxyl number, 156; chlorine content, 59%; melting point 91° C. Calculated: Saponification number, 312; hydroxyl number, 156; chlorine content, 59.4%.

*Example II*

The components:

| | G. |
|---|---|
| Pentachlorophenol, solidification point 191° C. | 266 |
| Water, distilled | 500 |
| Calcium chloride | 18 |
| Epichlorohydrin, commercial | 125 | were combined at room temperature in a cylindrical glass vessel equipped with a reflux cooler while being stirred well. The mixture was heated to 90° C. within 20 minutes and maintained at that temperature for 1.5 hours. Stirring was then continued until room temperature was reached. At about 40° C., the liquid ether became solid. After washing twice while stirring with an intensive stirrer, the solid ether was suctioned off and dried. The yield amounted to 344.4 grams, which is 96% of the theoretical yield. After recrystallization from aqueous acetone, the following characterizing numbers were found:

Found: Saponification number, 314; chlorine content, 58.9%; hydroxyl number, 153/155; melting point, 91° C. Calculated: Saponification number, 312; chlorine content, 59.2%; hydroxyl number, 156.

*Example III*

The ingredients:

| | G. |
|---|---|
| Phenol, freshly distilled | 94 |
| Water, distilled | 250 |
| Calcium chloride, water-free | 8 |
| Epichlorohydrin | 120 | were combined at room temperature in a cylindrical glass vessel equipped with a reflux cooler while stirring well. The temperature was increased to 85° C. within 30 minutes and maintained for 2½ hours. Subsequently, the oily underlayer was mechanically separated, washed twice with a little water and rendered water- and epichlorohydrin-free under vacuum. The yield of the crude ether product was 182 grams or 97.7% of the theoretical yield. This product had a saponification number of 302 (calculated as 300). The ether distilled at 110° to 112° C. and 0.9 mm. Hg pressure as a slightly viscous, water-clear liquid having a very faintly aromatic odor (not a phenol odor).

*Example IV*

A mixture of:

| | G. |
|---|---|
| Tetrabromo-bis-phenol, commercial | 136 |
| Water, distilled | 350 |
| Calcium chloride, water-free | 10 |
| Epichlorohydrin, commercial | 80 | were combined at room temperature in a cylindrical stirring vessel equipped with a reflux cooler and heated to 90° C. within 15 minutes. The solid/aqueous suspension turned into a brown oily/aqueous suspension. Intensive stirring was carried out for a total of 3 hours at 90° C. The speed and degree of reaction depend upon a good stirring effect. If stirring is carried out in the cold, the oily phase lumps at about 50° C. The tough, light brown product is ether-soluble. It was absorbed in ether, after pouring off the aqueous phase, washed, dried, filtered over carbon and rendered ether-free. In order to remove traces of epichlorohydrin, the residue was heated under vacuum to 70° C. Obtained was 179 grams, 98% of the theoretical yield, of faintly colored and highly viscous ether, having the following characterizing numbers:

Found: Saponification number, 307/308; chlorine content, 9.4%; bromine content, 42.2%. Calculated: Saponification number, 308; chlorine content, 9.7%; bromine content, 43.9%.

*Example V*

A mixture made up of:

| | G. |
|---|---|
| p-Cresol, chemically pure | 54 |
| Water, distilled | 200 |
| Potassium chloride, chemically pure | 5 |
| Epichlorohydrin, commercial | 60 | was combined at room temperature in a stirring vessel and heated to 90° C. within 15 minutes and maintained at 90° C. for 5 hours while intensive stirring was effected. The mixture was stirred until cold. Then, the oily substratum was separated off in a separating funnel after having settled well. The thinly liquid, slightly yellow monoether was rendered free of water and epichlorohydrin under vacuum and distilled. In addition to a small preliminary run and residue, 68 grams, 68% of the theoretical yield, of monoether was obtained as the main fraction. This product distilled over at between about 122° and 124° C. and at a pressure of 1 mm. Hg. It had a chlorine content of 17.1% (calculated as 17.7%).

Another experiment, wherein calcium chloride was used and during which the monoether was isolated by extraction with ether and subsequent distillation, showed a yield of 89% of theoretical.

It is to be noted that a weight ratio of at least about 2:1 of water with respect to the amount of epichlorohydrin is used in the aqueous phase reaction in the above examples and that the maximum molar amount of epichlorohydrin employed per phenolic hydroxyl group is about 1.62:1.

The invention being thus described, it will be obvious that the same may be varied in many ways, such variations are not to be regarded as a departure from the spirit and scope of the invention and all such modifications are intended to be included within the scope of the following claims.

I claim:

1. A process for the preparation of phenol-α-monochlorohydrin monoethers which comprises reacting a phenol selected from the group consisting of mononuclear monohydric phenols, mononuclear polyhydric phenols, polynuclear monohydric phenols, polynuclear polyhydric phenols, alkyl, and halogen nuclear-substituted derivatives thereof and mixtures of said phenols with epichlorohydrin in the presence of water, in a weight ratio of water epichlorohydrin of at least about 2:1, and a water-soluble neutral inorganic alkaline earth metal salt at a temperature of between approximately 70° and 100° C., said epichlorohydrin being employed in amounts of up to about 1.62 moles per phenolic hydroxyl group.

2. The process of claim 1, wherein said alkaline earth metal salt is used in an amount of 0.5 to 20% by weight, based on the weight of the phenol employed.

3. The process of claim 1, wherein the reaction is carried out as a continuous process.

4. The process of claim 1, wherein said alkaline earth metal salt is selected from the group consisting of calcium chloride, calcium sulfate and calcium nitrate.

5. The process of claim 1, wherein said alkaline earth metal salt is calcium chloride.

6. A process for the preparation of phenol-α-monochlorohydrin monoethers which comprises reacting a monohydric phenol with epichlorohydrin in the presence of water, in a weight ratio of water to epichlorohydrin of at least about 2:1, and a water-soluble neutral inorganic alkaline earth metal salt at a temperature of between approximately 70° and 100° C., said epichlorohydrin being employed in amounts of up to about 1.62 moles per phenolic hydroxyl group.

7. The process of claim 6, wherein said monohydric phenol is pentachlorophenol.

8. The process of claim 6, wherein said monohydric phenol is phenol.

9. The process of claim 6, wherein said monohydric phenol is a cresol.

References Cited

UNITED STATES PATENTS 2,571,217  10/1951  Davis et al. _____ 260—613
3,023,225  2/1962   Reinking _____ 260—613

FOREIGN PATENTS 1,286,345  1/1962  France.

BERNARD HELFIN, *Primary Examiner.*